United States Patent
Asti et al.

(10) Patent No.: US 10,907,498 B2
(45) Date of Patent: Feb. 2, 2021

(54) METHODS OF DETECTING ONE FAILURE IN A BURNER OF A COMBUSTOR AND TURBINE SYSTEMS

(71) Applicant: Nuovo Pignone Tecnologie Srl, Florence (IT)

(72) Inventors: Antonio Asti, Florence (IT); Miriam Losapio, Florence (IT); Mariateresa Paci, Florence (IT)

(73) Assignee: Nuovo Pignone Technologies SRL, Florence (IT)

( * ) Notice: Subject to any disclaimer, the term of this patent is extended or adjusted under 35 U.S.C. 154(b) by 187 days.

(21) Appl. No.: 15/919,646

(22) Filed: Mar. 13, 2018

(65) Prior Publication Data
US 2018/0266272 A1 Sep. 20, 2018

(30) Foreign Application Priority Data
Mar. 14, 2017 (IT) .................... 102017000028071

(51) Int. Cl.
*F01D 21/12* (2006.01)
*F02C 9/28* (2006.01)
(Continued)

(52) U.S. Cl.
CPC .......... *F01D 21/12* (2013.01); *F01D 17/085* (2013.01); *F01D 21/003* (2013.01); *F01D 21/16* (2013.01); *F02C 9/28* (2013.01); *F23N 5/022* (2013.01); *F23N 5/245* (2013.01); *G01K 3/14* (2013.01); *G01K 13/02* (2013.01);
(Continued)

(58) Field of Classification Search
CPC ........................... F01D 21/12; F23N 2231/06
See application file for complete search history.

(56) References Cited

U.S. PATENT DOCUMENTS

| 4,115,998 A | * | 9/1978 | Gilbert | ..................... F02C 9/00 374/1 |
| 2002/0183916 A1 | * | 12/2002 | Cleary | ..................... F23N 5/003 701/100 |

(Continued)

FOREIGN PATENT DOCUMENTS

EP 1 445 450 A1 8/2004

OTHER PUBLICATIONS

Asti, A., et al., Method of detecting flameout in a combustor and turbine system, GE co-pending Application No. 102017000028052, filed on Mar. 14, 2017.

(Continued)

*Primary Examiner* — Scott J Walthour
(74) *Attorney, Agent, or Firm* — Fletcher Yoder, P.C.

(57) ABSTRACT

The method is used for detecting one failure in a burner of a combustor of a turbine system; the combustor comprises a plurality of burners arranged annularly; the turbine system comprises a turbine downstream of the combustor, the method comprising the steps of: A) providing a plurality of temperature sensors arranged annularly at the outlet of the turbine, B) detecting a plurality of temperatures through the plurality of temperature sensors, C) calculating a temperature spread indicator as a function of the plurality of temperatures, and D) carrying out a comparison the temperature spread indicator and a threshold; a positive result of this comparison indicates a burner failure.

20 Claims, 5 Drawing Sheets

(51) Int. Cl.
  *F01D 17/08*  (2006.01)
  *F23N 5/24*  (2006.01)
  *G01K 13/02*  (2021.01)
  *F23N 5/02*  (2006.01)
  *G01K 3/14*  (2006.01)
  *F01D 21/00*  (2006.01)
  *F01D 21/16*  (2006.01)

(52) U.S. Cl.
  CPC ...... *F05D 2220/32* (2013.01); *F05D 2240/35* (2013.01); *F05D 2260/80* (2013.01); *F05D 2260/83* (2013.01); *F23N 2231/06* (2020.01); *F23N 2241/20* (2020.01); *G01K 2013/024* (2013.01)

(56) References Cited

U.S. PATENT DOCUMENTS

| | | | |
|---|---|---|---|
| 2004/0079070 A1 | 4/2004 | Macchia | |
| 2006/0245914 A1* | 11/2006 | Adam | G01K 3/06 |
| | | | 415/118 |
| 2010/0024431 A1* | 2/2010 | Panov | F02C 7/262 |
| | | | 60/779 |
| 2013/0259088 A1 | 10/2013 | Bellis et al. | |

OTHER PUBLICATIONS

Italian Search Report and Written Opinion issued in connection with corresponding IT Application No. 102017000028071 dated Nov. 7, 2017.

\* cited by examiner

METHODS OF DETECTING ONE FAILURE IN A BURNER OF A COMBUSTOR AND TURBINE SYSTEMS

TECHNICAL FIELD

Embodiments of the subject matter disclosed herein correspond to methods of detecting one failure in a combustor and to turbine systems.

BACKGROUND ART

During operation of a turbine system one or more burners of a combustor may fail, i.e. their flames extinguish. Such events should not be confused with a normal operation condition of the turbine system during which one or more burners are purposely inactive, i.e. the so-called "staging".

Clearly, it is desirable to detect any combustor failure condition in a turbine system and take corrective measures.

It is also desirable that such detection be done in a simple way, i.e. with a simple arrangement of devices that is easily applied to the turbine system, for example that does not require to disassemble the turbine system.

SUMMARY

It is to be noted that any combustor failure condition starts with the failure of a single burner; other burner failures may follow.

Therefore, the Inventors have thought of detecting only one failure in a burner of a combustor of a turbine system, i.e. the first burner failure that occurs.

Furthermore, they thought of doing such detection by measuring temperatures in the turbine system far from the combustor, in particular at the outlet of a turbine downstream of the combustor, more in particular at the outlet of the last turbine of the system.

Once one burner failure is detected, it is advantageous to locate or even identify which burner of the combustor has failed.

Embodiments of the subject matter disclosed herein relate to methods of detecting one failure in a combustor of a turbine system.

According to such embodiments, the method comprises the steps of: A) providing a plurality of temperature sensors arranged annularly at the outlet of the turbine, B) detecting a plurality of temperatures through the plurality of temperature sensors, C) calculating a temperature spread indicator as a function of the plurality of temperatures, and D) carrying out a comparison between the temperature spread indicator and a threshold; a positive result of the comparison indicates a burner failure.

Other embodiments of the subject matter disclosed herein relate to turbine systems.

According to such embodiments, the turbine system comprises a compressor, a burner downstream of the compressor, a turbine downstream of the combustor, and a plurality of temperature sensors arranged annularly at the outlet of the turbine; the combustor comprises a plurality of burners arranged annularly; the system comprises a digital signal processing unit adapted to carry out a burner failure detection method.

It is to be noted that the present invention has been conceived for application in the field of "Oil & Gas".

BRIEF DESCRIPTION OF DRAWINGS

The accompanying drawings, which are incorporated herein and constitute an integral part of the present specification, illustrate exemplary embodiments of the present invention and, together with the detailed description, explain these embodiments. In the drawings.

DETAILED DESCRIPTION

The following description of exemplary embodiments refers to the accompanying drawings.

The following description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
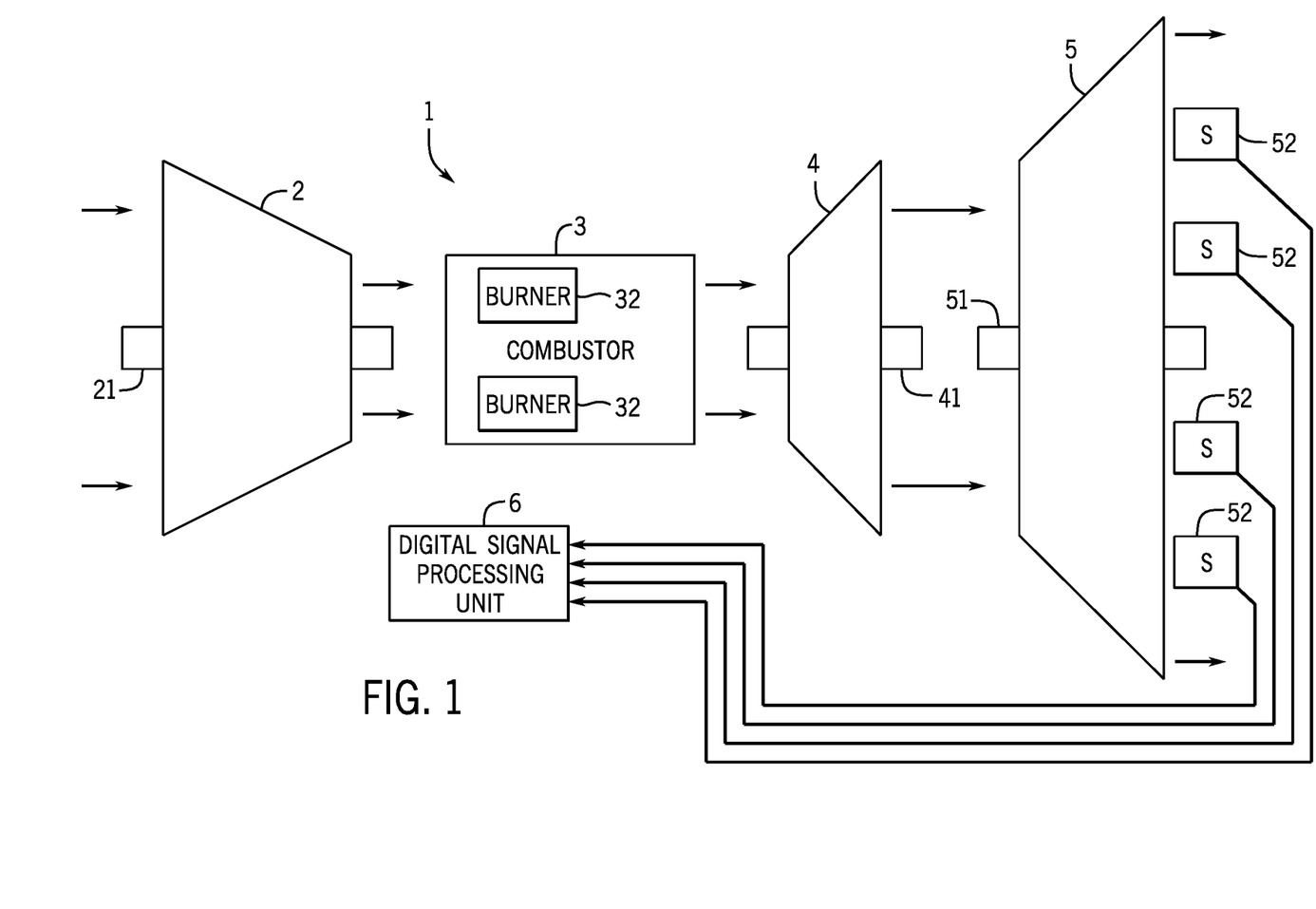
FIG. 1 shows a schematic diagram of a turbine system using a combustor failure detection method according to the subject matter disclosed herein.

FIG. 1 shows a turbine system 1 comprising: a compressor 2, a combustor 3, a first turbine 4 (that may be called "high-pressure turbine"), a second turbine 5 (that may be called "low-pressure turbine"), and a digital signal processing unit 6. Compressor 2 has an own shaft 21; the first turbine 4 has an own shaft 41; the second turbine 5 has an own shaft 51 (mechanically disconnected from shaft 41). An outlet of compressor 2 is fluidly connected to an inlet of combustor 3; an outlet of combustor 3 is fluidly connected to an inlet of turbine 4; an outlet of turbine 4 is fluidly connected to an inlet of turbine 5. It is to be noted that combustor 3 has at least another inlet (not shown in FIG. 1), for example a fuel inlet.

Figure 2:
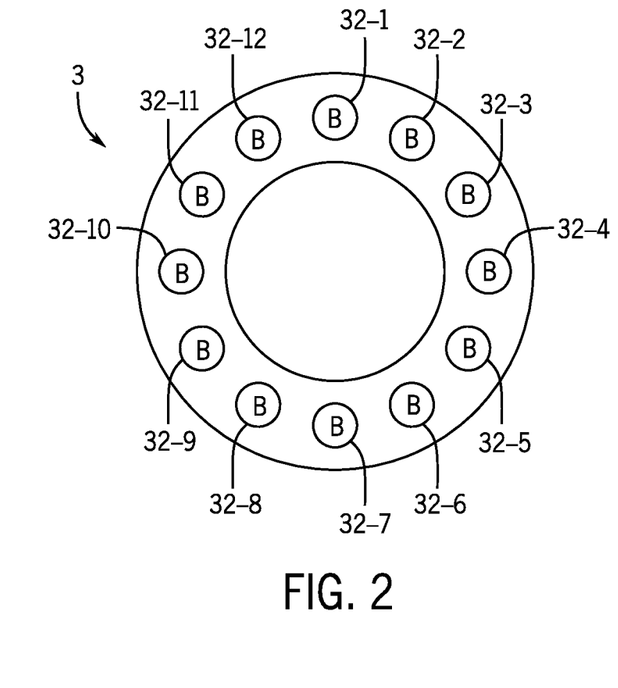
FIG. 2 shows a schematic section view of a combustor of the turbine system of FIG. 1.

Combustor 3 comprises a plurality of burners 32 arranged annularly in a single annular combustion chamber (see also FIG. 2). In FIG. 2, there are twelve burners labelled from 32-1 to 32-12; a lower number of burners is possible for example down to five; a higher number of burners is possible for example up to fifty.

Figure 3:
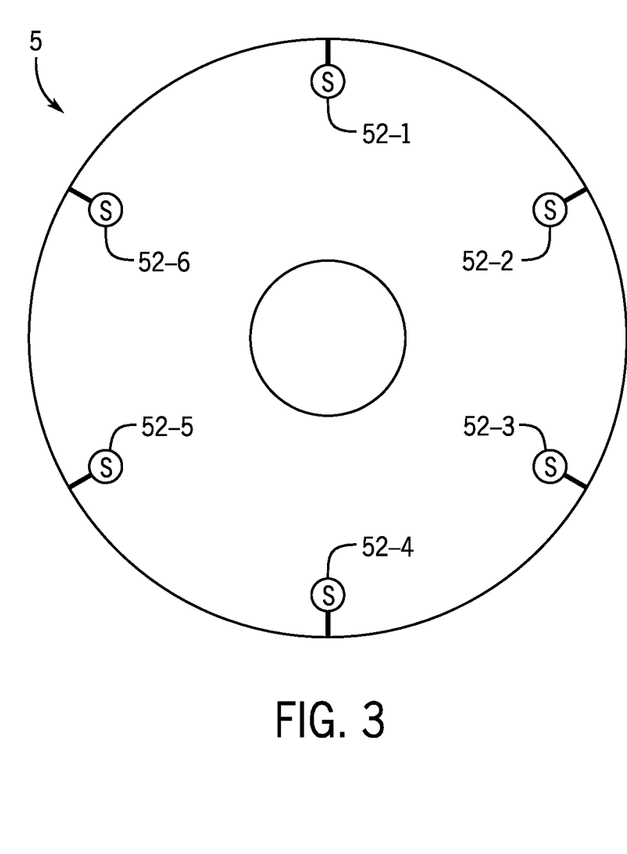
FIG. 3 shows a schematic front view of a turbine of the turbine system of FIG. 1.

Turbine system 1 comprises a plurality of temperature sensors 52 arranged annularly at the outlet of turbine 5 (see also FIG. 3). In FIG. 3, there are six sensors labelled from 52-1 to 52-6; a lower number of sensors is possible for example down to three; a higher number of sensors is possible for example up to twenty. It is to be noted that the number of sensors 52 is lower than the number of burners 32.

According to embodiments alternative to the one of FIG. 1, the turbine system may comprise one or two or three or more compressors (for example serially connected) and/or one or two or three or more turbines (for example serially connected).

According to embodiments alternative to the one of FIG. 1, the sensors may be arranged elsewhere typically annularly for example at the outlet of turbine 4, but not inside the combustion chamber of combustor 3 or at the outlet of combustor 3.

Digital signal processing unit 6 is electrically connected to sensors 52 and receives measure signals from these sensors.

In order to detect one failure in a burner of combustor (for example combustor 3) of a turbine system, the following steps may be carried out:

A) providing a plurality of temperature sensors (for example sensors 52) arranged annularly at the outlet of a turbine (for example turbine 5) of the turbine system, B) detecting a plurality of temperatures through the plurality of temperature sensors, C) calculating a "temperature spread indicator" as a function of the plurality of temperatures, and D) carrying out a comparison between the temperature spread indicator and a threshold, wherein a positive result of this comparison indicates a burner failure.

During normal operation, the temperature at the outlet of a turbine of the turbine system rather uniform; for example, the temperatures detected by sensors 52-1, 52-2, 52-3, 52-4, 52-5 and 52-6 at different angular positions at a certain time are close to each other (even if never perfectly identical). Considering FIG. 1, the temperatures at the outlet of turbine 5 are more uniform than the temperatures at the outlet of turbine 4.

If, at a certain time, one burner fails, i.e. it does not contribute to combustion in the combustion chamber, the temperature spread in the temperature detected by the sensors at different angular positions (for example sensors 52) increases considerably.

For example, a nominal temperature spread during normal operation may be e.g. 30° C. or 35° C. (the average temperature being for example 400-600° C.), while the temperature spread in case of one failure is much higher and may be e.g. 55° C. or 80° C. (the average temperature being substantially unchanged). The threshold at step D may be set for example at 45° C. or 50° C. As it will be explained in the following and as it is shown FIGS. 4, 5 and 6, it may be advantageous to use more than one threshold.

In the embodiment of FIG. 1, step B is carried out by sensors 52, and steps C and D are carried out by digital signal processing unit 6.

Figure 4:
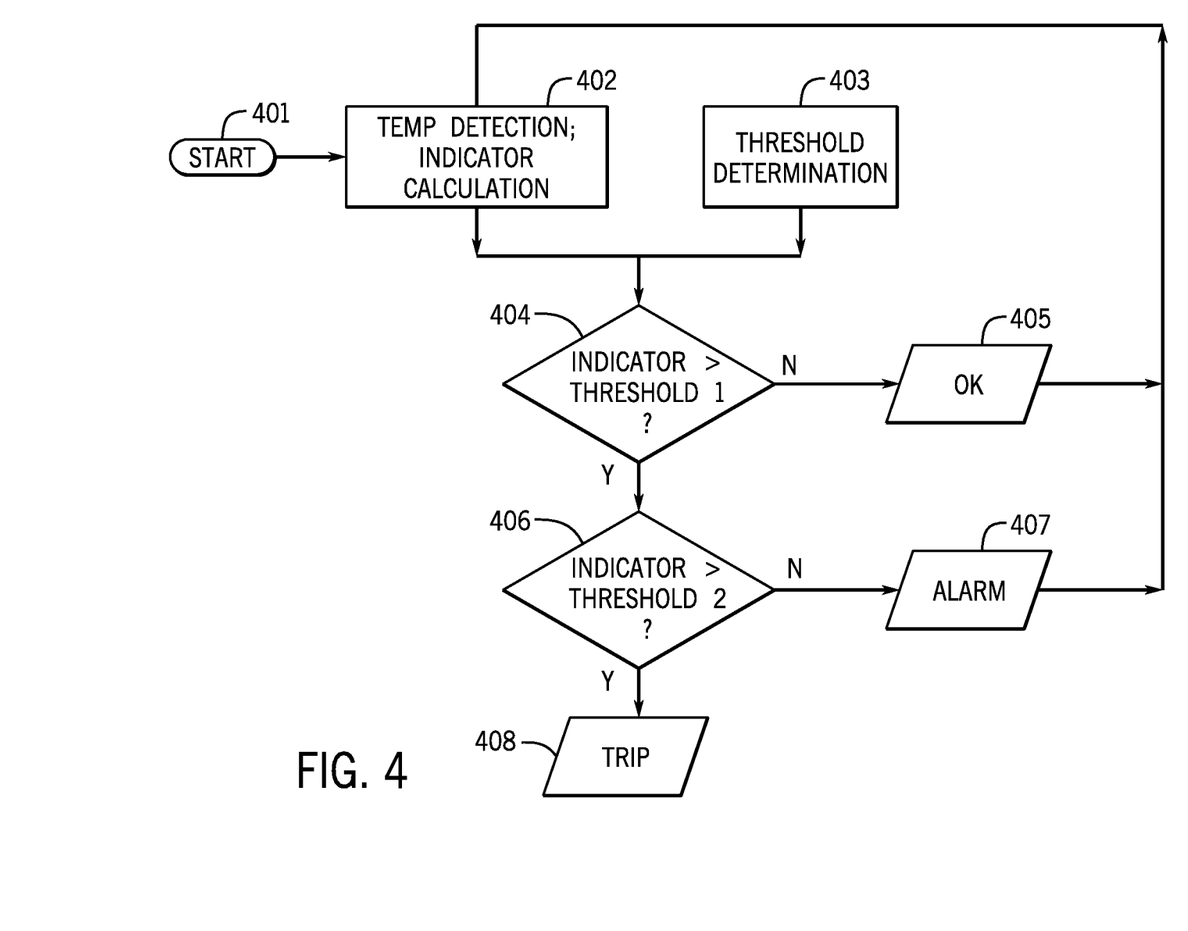
FIG. 4 shows a flowchart of a first embodiment of the method according to the subject matter disclosed herein.

In the flowchart of FIG. 4, there is a block 401 corresponding to a START and a block 402 corresponding to step B (temperatures detection) and step C (indicator calculation). In particular, the "temperature spread indicator" may correspond simply to the "temperature spread"; for example, considering FIGS. 1, 2 and 3, at a certain time six temperatures are detected by the six sensors 52, then the minimum temperature is determined between the six detected temperatures (step C1), then maximum temperature is determined between the six detected temperatures (step C2), and the "temperature spread indicator" is calculated as the difference between the maximum temperature and the minimum temperature (step C3).

The threshold at step D is typically fixed and predetermined (i.e. not variable). If the threshold is variable, it may depend on a current load state of the turbine system 1; in FIG. 4, block 403 corresponds to a pre-determination of one or more thresholds.

In the flowchart of FIG. 4, two different thresholds (i.e. threshold-1 and threshold-2) are used (see block 404 and block 406); in particular, the first threshold is lower than the second threshold (i.e. threshold-1<threshold-2); the first threshold may be e.g. 55° C. and the second threshold may be e.g. 80° C.

In the flowchart of FIG. 4, block 404 corresponds to a comparison of the calculated temperature spread indicator with a first threshold (i.e. "is indicator>threshold-1?") and block 406 corresponds to a comparison of the calculated temperature spread indicator with a second threshold (i.e. "is indicator>threshold-2?"). A negative result N at block 404 indicates that there is no burner failure in the combustor 3 and, subsequently to step D, "OK" is signaled at block 405; for example, digital signal processing unit 6 may send an ok signal to a remote monitoring unit or send no signal at all. A positive result Y at block 404 indicates that there is one burner failure in the combustor 3. A negative result N at block 406 indicates there is one burner failure in the combustor 3 but the failure is not severe or, more in general, there is a "first-type burner failure" and, subsequently to step D, "ALARM" is signaled at block 407; for example, digital signal processing unit 6 may send an alarm signal to a remote monitoring unit. A positive result Y at block 406 indicates that there is one burner failure in the combustor 3 but the failure is severe or, more in general, there is a "second-type burner failure" and, subsequently to step D, "TRIP" of turbine system 1 (i.e. switching-off) is carried at block 408.

After blocks 405 and 407, the flow returns to block 402. This means that the "temperature spread indicator" is calculated repeatedly, in particular periodically; more precisely, at least steps A, B, C and D are cyclically repeated in time. The average repetition period may be in the range from e.g. 1 mS to e.g. 10 S.

According to the embodiment just described, as soon as a threshold is reached an action is taken.

Figure 5:
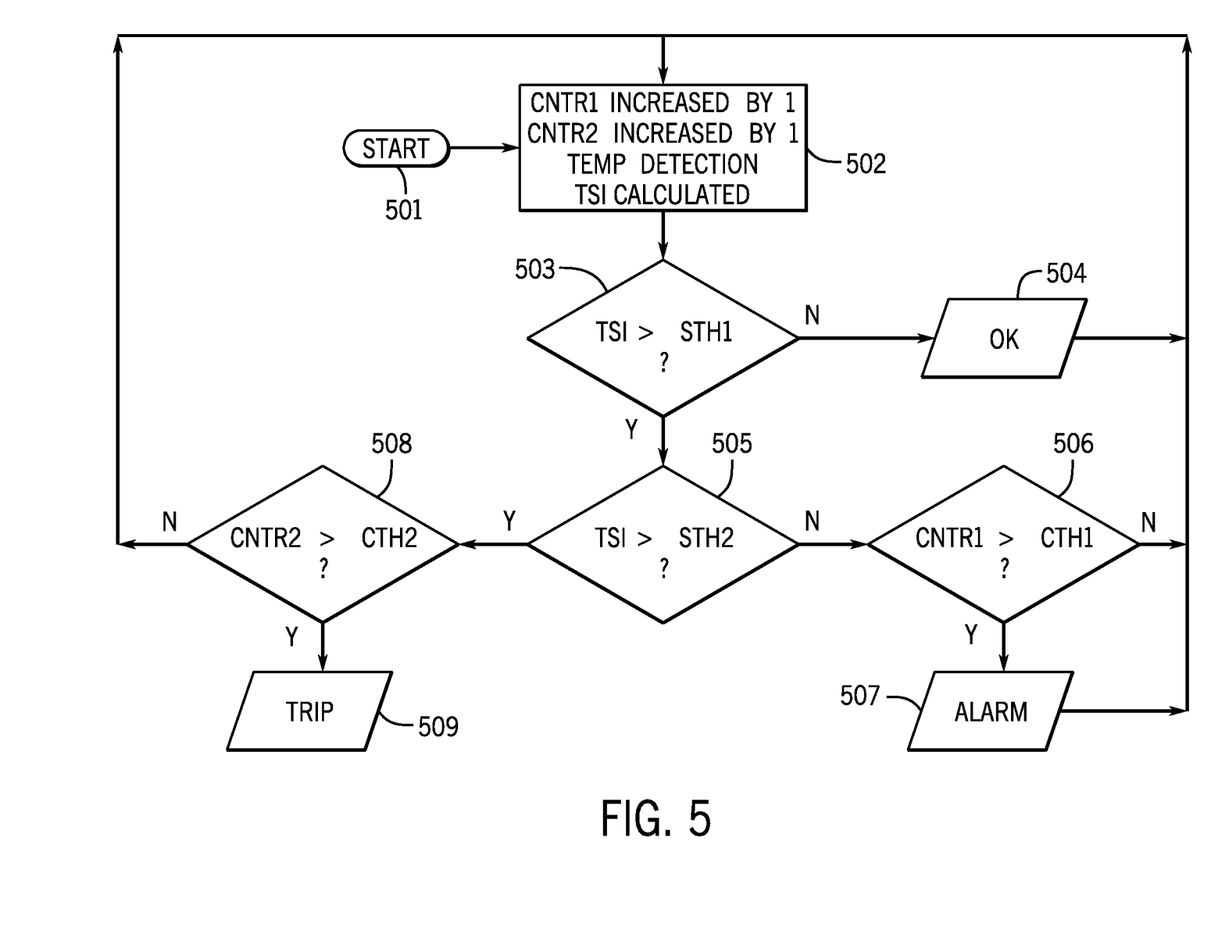
FIG. 5 shows a flowchart of a second embodiment of the method according to the subject matter disclosed herein.

Alternatively, it may be provided that an action is taken only after a predetermined time or after a predetermined number of "consecutive positive results" as for example in the flowchart of FIG. 5.

In the flowchart of FIG. 5, there is a block 501 corresponding to a START wherein:

a first counter CNTR1 is set to zero, a second counter CNTR2 is set to zero, a first counter threshold CTH1 is set to N1 (for example 30), a second counter threshold CTH2 is set to N2 (for example 10), a first spread threshold STH1 is set to T1 (for example 55° C.), a second spread threshold STH2 is set to T2 (for example 80° C.);

in the following, it is assumed, as an example, that a "temperature spread indicator" TSI corresponds simply to the "temperature spread" and that the repetition period is approximately 1 S.

At block 502, counter CNTR1 is increased by 1, counter CNTR2 is increased by 1, a plurality of temperatures are detected by the plurality of temperature sensors, the temperature spread indicator TSI is calculated.

At block 503 the comparison "TSI>STH1?" is carried out; N corresponds to a negative comparison and Y corresponds to a positive comparison.

At block 505 the comparison "TSI>STH2?" is carried out; N corresponds to a negative comparison and Y corresponds to a positive comparison.

At block 504 "OK" is signaled and counters CNTR1 and CNTR2 are reset, i.e. set to zero, and then the flow returns to block 502.

At block 506 the comparison "CNTR1>CTH1?" is carried out; N corresponds to a negative comparison and Y corresponds to a positive comparison; in case of negative comparison the flow returns to block 502; in case of positive comparison the flow passes to block 507.

At block 508 the comparison "CNTR2>CTH2?" is carried out; N corresponds to a negative comparison and Y corresponds to a positive comparison; in case of negative comparison the flow returns to block 502; in case of positive comparison the flow passes to block 509.

At block 507 "ALARM" is signaled and then the flow returns to block 502.

At block 509 "TRIP" of turbine system (i.e. switching-off) is carried out.

This means that an alarm is signaled only if a temperature spread greater than 55° C. persists for more than 30 seconds and trip is carried out only if a temperature spread greater than 80° C. persists for more than 10 seconds.

It is to be noted that, according to a flowchart alternative to the one of FIG. 4, block 406 is not present and block 407 is located immediately before or after block 408, i.e. there is only one threshold, the turbine system is either considered "OK" or "faulty", and when "faulty" an alarm is signaled and the turbine system is switched-off.

The calculation of the "temperature spread indicator" (step C) may be more complex than the one just described.

The comparison of the "temperature spread indicator" (step D) may be more complex than the one just described.

In the embodiments just described, the "temperature spread indicator" is a number. In the embodiment that will be described in the following with the aid of FIG. 6, the "temperature spread indicator" is a set of numbers.

Figure 6:
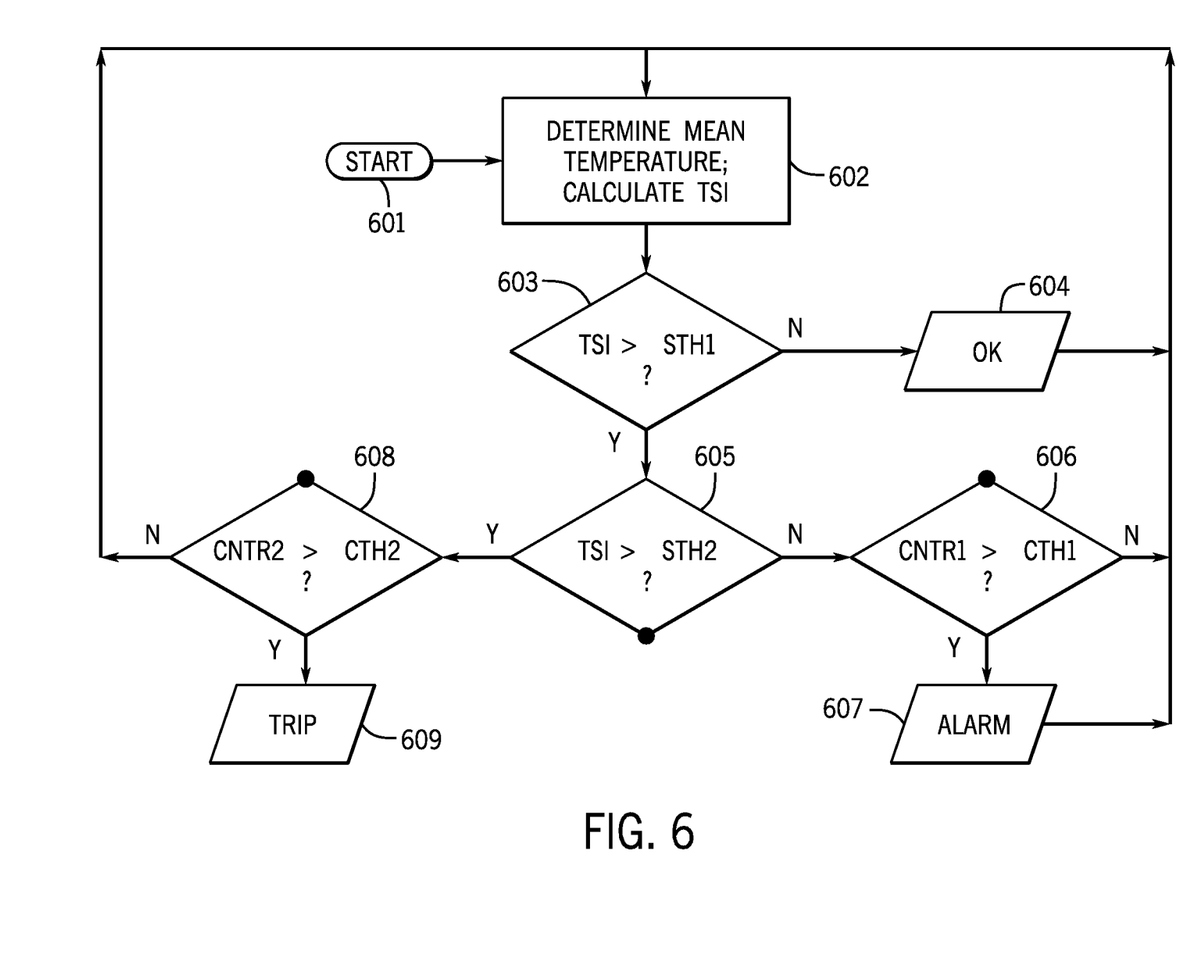
FIG. 6 shows a flowchart of a third embodiment of the method according to the subject matter disclosed herein.

It is to be noted that the flowchart of FIG. 6 is graphically very similar to the flowchart of FIG. 5; the black big dot at blocks 603, 605, 606 and 608 means that the corresponding test is repeated many times, in particular it is repeated for each of the sensors.

According to this embodiment, step C comprises the sub-steps of:
determining a mean temperature being the average of the plurality of temperatures detected at step B (step C4), and
calculating a temperature spread indicator as a plurality of values being functions of a corresponding plurality of differences between a temperature of the plurality of temperatures and the mean temperature (step C5);
in the flowchart of FIG. 6, such step C is carried out at block 602.

An advantageous formula for calculating the temperature spread indicator, namely its values, is the following:

$$\mathrm{Phi}(i) = e^{-(k*(T_i - T_{ave})^2)}$$

wherein "i" is an index of a temperature sensor of the plurality of temperature sensors.

If the above formula is applied to the turbine system of FIG. 1 and in the flowchart of FIG. 6, for any repetition of the loop six values from Phi(1) to Phi(6) are calculated for the six sensors from 52-1 to 52-6.

The above formula is advantageous as it increases the signal-to-noise ratio; in other words, the exponential function highlights the temperature spread variation due to one burner failure in a more clear distinct way.

At step D each of the calculated values is compared with at least one threshold; the threshold is the same for all sensors. If the above formula is used, the comparison is "value<threshold?", a negative comparison N means that the value lesser than the threshold and a positive comparison Y means that the value greater than the threshold.

In the flowchart of FIG. 6, two different indicator thresholds are used (see block 603 and block 605); in particular, the first threshold (block 603) is higher than the second threshold (block 605).

If a single indicator threshold is used, its value may be e.g. 0.2.

If two indicator thresholds are used, the value of the first threshold may be e.g. 0.25 and the value of the second threshold may be e.g. 0.15.

Any comparison positive result indicates a burner failure.

Considering now the flowchart of FIG. 6, the flow passes from block 603 to block 605 after that all comparisons are carried out and if at least one comparison is positive, the flow passes from block 606 to block 607 (alarm signaling) after that all comparisons are carried out and if at least one comparison is positive, the flow passes from block 608 to block 609 (trip performing) after that all comparisons are carried out and if at least one comparison is positive.

This means that alarm signaling and trip performing are carried out if measures from any (not all) of the sensors justify such actions.

As in the flowchart of FIG. 5, also in the flowchart of FIG. 6 actions are taken only in case of persistence and not immediately; this is the reason of block 605. The persistence thresholds may be identical to the flowchart of FIG. 5, i.e. 30 seconds and 10 seconds.

In order to take into account that the indicator corresponds to a plurality of values and that an action requires a plurality of repetitions, a set of counters are used for each of the thresholds used.

For example, if there are six temperature sensors (see FIG. 3) and two spread thresholds (see FIG. 6), twelve counters are used. In fact, for each sensor a first counter indicates how far alarm signaling is and a second counter indicates how far trip performing is.

As for the flowchart of FIG. 5, also for the flowchart of FIG. 6 variations are possible.

Once one burner failure is detected, it is advantageous to locate the burner of the combustor that has failed or, even better, identify exactly which burner of the combustor has failed.

In order to do that, if there is one burner that has failed the plurality of detected temperatures may be processed based on predetermined data. The result of such processing may be a burner position or a burner position range of the faulty burner.

The above mentioned predetermined data may be data obtained during a calibration phase of the turbine system carried out at the manufacturing site, or at the installation site, or partially at the manufacturing site and partially at the installation site Such processing may comprise the steps of:
E) identifying a temperature sensor detecting a minimum temperature,
F) determining a sensor angular position of this temperature sensor, and
G) subtracting a predetermined angular shift or a predetermined angular shift range from the determined sensor angular position and so a burner position or a burner position range of the faulty burner is obtained.

Considering FIG. 2 and FIG. 3, if, for example, the minimum temperature is detected by sensor 52-2, according to a first embodiment of the above processing, there might be an angular shift of 150° (anti-clockwise), the faulty burner is burner 32-10; if the minimum temperature is detected by sensor 52-6, the faulty burner is burner 32-6.

Considering FIG. 2 and FIG. 3, if, for example, the minimum temperature is detected by sensor 52-2, according to a second embodiment of the above processing, there might be an angular shift range of 120°-180° (anti-clockwise), the faulty burner is any of burners 32-9, 32-10, 32-11; if the minimum temperature is detected by sensor 52-6, the faulty burner is any of burners 32-5, 32-6, 32-7. Even in this case, wherein the position of the faulty burner is not precisely identified, maintenance is highly facilitated.

It is to be considered that the above-mentioned predetermined angular shift or predetermined angular shift range may depend on the operating status of the turbine system (for example, "full-load", "half-load").

The burner failure detection methods according to the subject matter disclosed herein may be used in a turbine system like the one of FIG. 1 or in a system similar thereto.

The turbine system should comprise a digital signal processing unit adapted to carry out such methods; such unit typically comprises a software program for this purpose. In the embodiment of FIG. 1, such unit is labelled 6.

In order to carry out a burner failure detection method, at least one plurality of temperature sensors (with reference to FIG. 1, sensors 52) arranged annularly at the outlet of a turbine of the turbine system are necessary.

These sensors may allow not only to detect one burner failure but also to locate the faulty burner; location may correspond even to identification of the faulty burner.

The invention claimed is:

1. A method of detecting a burner failure, and locating a faulty burner associated with the burner failure, in a combustor of a turbine system, wherein the combustor comprises a plurality of burners arranged annularly, wherein the turbine system comprises a turbine downstream of the combustor, the method comprising the steps of:
   A) providing a plurality of temperature sensors arranged annularly at an outlet of the turbine;
   B) detecting a plurality of temperatures through the plurality of temperature sensors;
   C) calculating a temperature spread indicator as a function of the plurality of temperatures; and
   D) carrying out a comparison between the temperature spread indicator and a threshold, wherein the temperature spread indicator being greater than the threshold or the temperature spread indicator being greater than the threshold for a set of consecutive cycles of the steps B, C, and D cyclically repeated in time-indicates the burner failure;
   wherein the method further comprises the steps of:
   E) identifying an identified temperature sensor of the plurality of temperature sensors that is detecting a minimum temperature;
   F) determining a sensor angular position of the identified temperature sensor; and
   G) subtracting an angular shift or an angular shift range from the sensor angular position to obtain a burner position or a burner position range of the faulty burner; wherein a number of sensors of the plurality of sensors is less than a number of burners of the plurality of burners.

2. The method of claim 1, wherein the steps B, C and D are cyclically repeated in time, and wherein the burner failure is indicated by the temperature spread indicator being greater than the threshold for the set of consecutive cycles.

3. The method of claim 1, wherein step C comprises the sub-steps of: C1) determining a minimum temperature in the plurality of temperatures, C2) determining a maximum temperature in the plurality of temperatures, and C3) calculating the temperature spread indicator as a difference between the maximum temperature and the minimum temperature.

4. The method of claim 3, wherein steps B, C and D are cyclically repeated in time;
   wherein the threshold is a first threshold;
   wherein an alarm is signaled when consecutively-determined temperature spread indicators in step C are greater than the first threshold over a set of N1 consecutive comparisons in step D;
   wherein the turbine system is tripped when consecutively-determined temperature spread indicators in step C are greater than a second threshold over a set of N2 consecutive comparisons in step D.

5. The method of claim 1, comprising the step of signaling an alarm in response to detecting the burner failure.

6. The method of claim 1, comprising the step of tripping the turbine system in response to detecting the burner failure.

7. The method of claim 1, wherein the angular shift or the angular shift range depends on an operating status of the turbine system.

8. The method of claim 1, wherein the step C comprises the sub-steps of:
   C1) determining a mean temperature being an average of the plurality of temperatures, wherein the temperature spread indicator includes a plurality of values; and
   C2) calculating the plurality of values of the temperature spread indicator, wherein each value of the plurality of values corresponds to a difference between a respective temperature of the plurality of temperatures and the mean temperature;
   wherein at the step D, each of the values of the plurality of values is compared with the threshold, and any value of the plurality of values being greater than the threshold or any value of the plurality of values being greater than the threshold for the set of consecutive cycles indicates the burner failure.

9. The method of claim 8, comprising the step of signaling an alarm in response to detecting the burner failure.

10. The method of claim 8, comprising the step of tripping the turbine system in response to detecting the burner failure.

11. The method of claim 8, wherein the steps B, C and D are cyclically repeated in time, and any value of the plurality of values being greater than the threshold for the set of consecutive cycles indicates the burner failure;
    wherein the threshold is a first threshold;
    wherein an alarm is signaled when any value of the plurality of values of the temperature spread indicator is greater than the first threshold for a first set of consecutive cycles of the steps B, C, and D cyclically repeated in time;
    wherein the turbine system is tripped when any value of the plurality of values of the temperature spread indicator is greater than a second threshold for a second set of consecutive cycles of the steps B, C, and D cyclically repeated in time.

12. A turbine system comprising a compressor, a combustor downstream of the compressor, a turbine downstream of the combustor, a plurality of temperature sensors arranged annularly at an outlet of the turbine, and a digital signal processing unit, wherein the combustor comprises a plurality of burners arranged annularly, and the digital signal processing unit is configured to:
- A) detect a plurality of temperatures through the plurality of temperature sensors;
- B) calculate a temperature spread indicator as a function of the plurality of temperatures; and
- C) carry out a comparison between the temperature spread indicator and a threshold, wherein the temperature spread indicator being greater than the threshold or the temperature spread indicator being greater than the threshold for a set of consecutive cycles of A, B, and C cyclically repeated in time indicates a burner failure;

wherein the digital signal processing unit, to locate a faulty burner associated with the burner failure, is configured to:
- D) identify an identified temperature sensor of the plurality of temperature sensors that detects a minimum temperature;
- E) determine a sensor angular position of the identified temperature sensor; and
- F) subtract an angular shift or an angular shift range from the sensor angular position to obtain a burner position or a burner position range of the faulty burner;

wherein a number of sensors of the plurality of sensors is less than a number of burners of the plurality of burners.

13. The turbine system of claim 12, wherein the digital signal processing unit is configured to cyclically repeat A, B, and C in time, and the temperature spread indicator being greater than the threshold for the set of consecutive cycles indicates the burner failure.

14. The turbine system of claim 12, wherein the digital signal processing unit is configured to signal an alarm in response to the burner failure.

15. The turbine system of claim 12, wherein the digital signal processing unit is configured to trip the turbine system in response to the burner failure.

16. The turbine system of claim 12, wherein the angular shift or the angular shift range depends on an operating status of the turbine system.

17. The turbine system of claim 12, wherein the digital signal processing unit is configured to calculate the temperature spread indicator by:

- B1) determining a mean temperature being an average of the plurality of temperatures, wherein the temperature spread indicator includes a plurality of values; and
- B2) calculating the plurality of values of the temperature spread indicator, wherein each value of the plurality of values corresponds to a difference between a respective temperature of the plurality of temperatures and the mean temperature;

wherein the digital signal processing unit is configured to carry out the comparison by comparing each of the values of the plurality of values to the threshold, and wherein any value of the plurality of values being greater than the threshold or any value of the plurality of values being greater than the threshold for the set of consecutive cycles indicates the burner failure.

18. The turbine system of claim 17, wherein the digital signal processing unit is configured to signal an alarm in response to the burner failure.

19. The turbine system of claim 17, wherein the digital signal processing unit is configured to trip the turbine system in response to the burner failure.

20. The turbine system of claim 17, wherein the digital signal processing unit is configured to cyclically repeated A, B, and C in time, and any value of the plurality of values being greater than the threshold for the set of consecutive cycles indicates the burner failure;

wherein the threshold is a first threshold;

wherein the digital signal processing unit is configured to signal an alarm in response to any value of the plurality of values of the temperature spread indicator being greater than the first threshold for a first set of consecutive cycles of A, B, and C cyclically repeated in time;

wherein the digital signal processing unit is configured to trip the turbine system in response to any value of the plurality of values of the temperature spread indicator being greater than a second threshold for a second set of consecutive cycles of A, B, and C cyclically repeated in time.

* * * * *